June 14, 1932.    H. F. MERRIAM    1,862,695
METHOD OF AND MEANS FOR TREATING WASTE GASES
Filed March 13, 1926    2 Sheets-Sheet 2
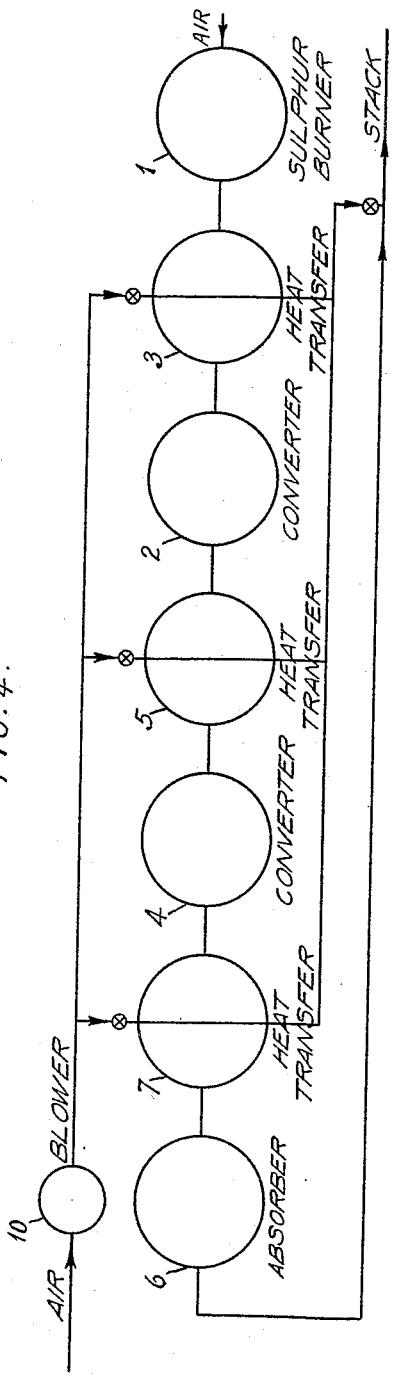
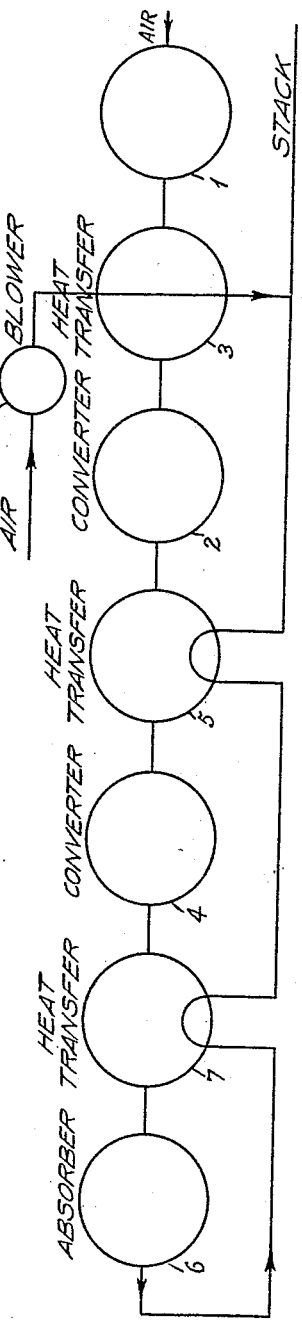
FIG. 4.
FIG. 5.
INVENTOR
HENRY F. MERRIAM
BY
Forbes Sibley
ATTORNEY Patented June 14, 1932

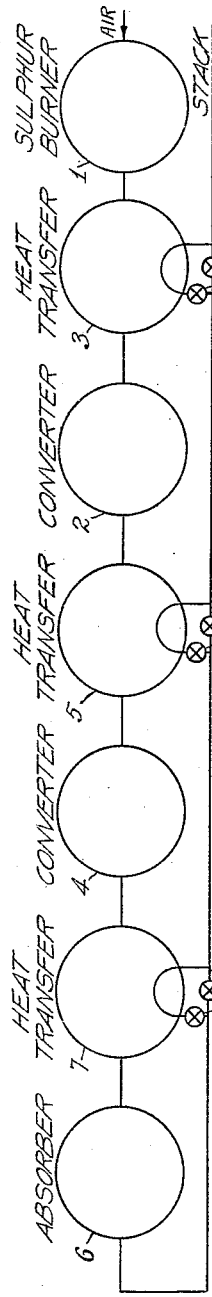
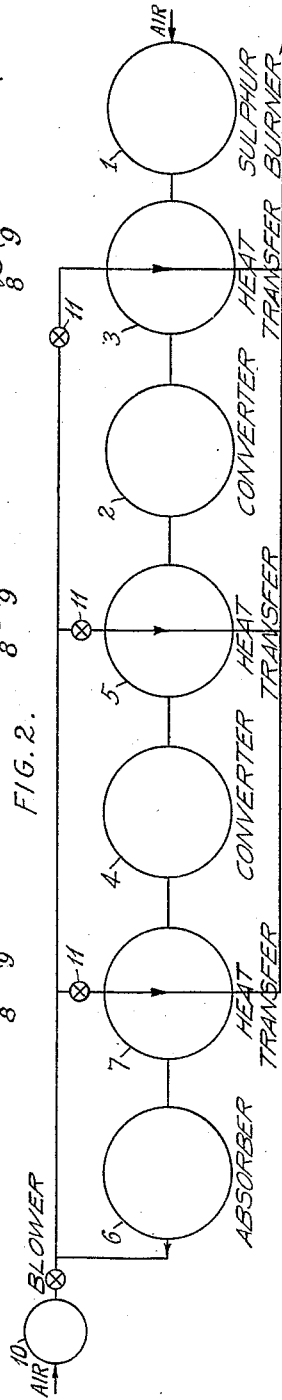
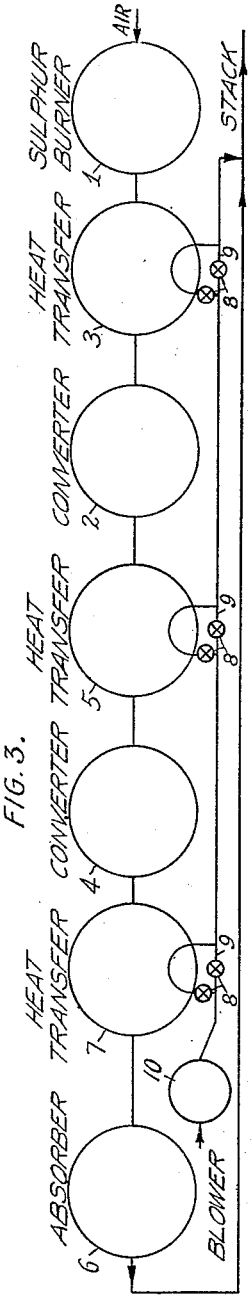

1,862,695

UNITED STATES PATENT OFFICE

HENRY F. MERRIAM, OF WEST ORANGE, NEW JERSEY, ASSIGNOR TO GENERAL CHEMICAL COMPANY, OF NEW YORK, N. Y., A CORPORATION OF NEW YORK

METHOD OF AND MEANS FOR TREATING WASTE GASES

Application filed March 13, 1926. Serial No. 94,561.

This invention relates in general to a method of handling obnoxious gases which must be discharged into the atmosphere, and has for its object, specifically, the improvement of methods by which the temperature of these gases is raised to increase their diffusion in the atmosphere and by which the dilution of these gases is increased by the addition of an unobjectionable gas to such an extent that they will not be harmful to life or vegetation in the vicinity of the point of discharge.

My invention relates further to an improvement in the process of manufacture of sulfuric acid, and apparatus therefor, whereby the objectionable waste gases from said process may be so treated as to render their presence in the atmosphere unobjectionable.

Considerable difficulty has been experienced in the past in treating exit gases containing substances which render them objectionable either by reason of their odor or their deleterious effect on animal and vegetable life in the vicinity. It has been found necessary to subject these gases to a purification treatment to remove the obnoxious elements or to build extremely high stacks from which the gases will pass into the atmosphere at an elevation sufficiently high so that dilution will render these gases unobjectionable by the time they may be forced down to the ground.

It has also been proposed to raise the stack temperature of the exit gases from such systems above their normal stack temperature in order that they will have a tendency to rise further into the atmosphere following their discharge from the stack and thus be further diluted. It has been proposed to heat the exit gases both by direct heating and by the introduction of an unobjectionable diluting gas which has been preheated to a temperature above that of the normal temperature of the gases in the stack. In all these systems it is necessary to supply external heat by coal stoves, oil burners and the like, with consequent increase in cost of operation due to the added cost of the additional fuel which must be used.

My system as herein disclosed provides an efficient means for heating and diluting objectionable exit gases before their discharge into the atmosphere in which no additional fuel is required and in which many other advantages may be obtained as will be apparent from a full understanding of my invention.

My invention consists briefly in passing objectionable exit gases, or an unobjectionable gas which is later used to dilute and raise the temperature of the objectionable exit gas, into heat transfer relation to points in the system in which excess heat is developed. In many instances, such for example as certain of the contact processes for the manufacture of sulfuric acid, particularly those in which brimstone is used as the source of sulfur, a large amount of excess heat is developed throughout the system and must be dissipated. In the past this excess heat has been wasted and no efficient use made of it. My invention proposes to utilize this heat and thereby eliminate the cost of additional fuel such as is required in all of the systems known to me at this time. Although I have illustrated my invention by showing its application to sulfuric acid contact process, it is obvious that it is not confined to this process but is of general application.

In the accompanying drawings I have diagrammatically illustrated several systems embodying my invention, in which Fig. 1 illustrates a system in which the exit gases are heated directly, without dilution, by excess heat developed in the system, Fig. 2 illustrates a similar system in which the exit gases are heated by passage in parallel through hot points in the system instead of in series as in Fig. 1, Fig. 3 illustrates a system in which excess heat is taken up by an unobjectionable gas such as air, which is then introduced into the stack gases to increase their temperature and to effect their dilution, Fig. 4 illustrates a system similar to Fig. 3 in which the unobjectionable gas is passed through the hot points in parallel rather than in series as in Fig. 3, and, Fig. 5 illustrates a combination of the above systems in which a portion of the excess heat is taken up directly by the exit gas and the remaining portion by air which is later introduced into the stack.

For purposes of convenience I have shown in all of the figures the same type of sulfuric acid system. Sulfur or sulfur ore is burned in the sulfur burner 1 to form an $SO_2$ gas mixture. A large amount of heat is developed in this process and the gas mixture is at a temperature far above that desired for conversion in the converter system 2. Consequently, the temperature of the gases must be lowered and this is normally done by cooling in a heat transferrer 3 by passing air or other cooling media through the heat transferrer. The cooled gases pass through the converter 2 in which a portion of the $SO_2$ is converted to $SO_3$ by catalytic oxidation. In this conversion a considerable amount of heat is developed which again raises the temperature of the gases above that desired for further conversion in converter system 4. Accordingly the gases must again be cooled in a heat transferrer 5. In passing through the converter 4 the temperature of the gases is again raised above that at which they should enter the absorber 6, so they must be again cooled in heat transferrer 7.

In the known systems of operation the exit gases from the absorber 6 are discharged into the atmosphere and will be found to contain an amount of $SO_2$ which, although slight, may be under certain conditions objectionable from a nuisance standpoint. These gases will ordinarily be at a temperature in the neighborhood of 100° C., which may not be sufficient to give good diffusion into the atmosphere without an excessively high stack. According to my invention I pass the exit gases back through the heat transferrers 3, 5 and 7 whereby their temperature is raised several hundred degrees to approximately 400° C. or above, depending of course on the amount of heat developed in the system.

I prefer to place valves 8 in the exit gas line to control the amount of gas passing through each heat transferrer whereby the temperature therein may be regulated. It will ordinarily be convenient to provide by-pass lines 9 around each heat transferrer in order that independent temperature control in each may be obtained.

It will be seen from Fig. 1 that the exit gases are passed in series through the heat transferrers. In the modification of this system shown in Fig. 2 the exit gases are passed through the heat transferrers in parallel. This is a more flexible system than that of Fig. 1 and allows a closer control of the temperature conditions desired in each heat transferrer, although the general principle of operation is the same. When operating the systems of Fig. 1 and Fig. 2 upon a strong $SO_2$ gas mixture in case excess heat is developed in the system greater than can be efficiently absorbed by the exit gases alone, the blower 10 may be used to introduce a controlled amount of air into the exit gas line to give a greater degree of cooling in the heat transferrers. In this modification the exit gases, while heated as described, will also be diluted with the air introduced into the exit line. It will be understood that suitable valves 11 will be placed in the system to control the amount of gas flowing through each part thereof.

In the system of Fig. 3 a cooling gas, such as air, is forced by the blower 10 through the heat transferrers 3, 5 and 7 and then into the stack. The temperature of the cooling air leaving the heat transferrers will be considerably above that of the stack gases. The resulting gas mixture in the stack will accordingly be at a temperature considerably above that of normal operation and in addition will be diluted to a concentration of only about 50% that of normal operation.

A closer control of the temperature conditions in the heat transferrers may be obtained with the system of Fig. 4 than with that of Fig. 3, by reason of the fact that the temperature of the cooling gas entering the heat transferrers 3 and 5 will be the same as that entering the heat transferrer 7, that is their temperature will be lower than at the corresponding point in Fig. 3. This means that more heat may be abstracted in the heat transferrers 3 and 5 in Fig. 4 with the same amount of cooling gas than in the heat transferrers 3 and 5 of Fig. 3. This resulting flexibility of operation is similar to that obtained in Fig. 2.

In the system of Fig. 4, blower 10, or other suitable pressure means, is used to force the cooling gas through the heat transferrers and into the stack. It will ordinarily be preferable to compress the cooling gas before passage through the heat transferrers rather than to draw the cooling gas through by suction, as the volume of gas to be handled by the blower will be smaller when the gas is compressed initially. Furthermore, by employing a blower which operates on cool gas, smaller volumes of gas have to be handled than would be the case where the propulsion of the gases is effected by instrumentalities operating on hot expanded volumes of gas.

It may often happen that it will not be efficient to absorb all the excess heat by the exit gases alone, nor to cool entirely by air. Under these conditions it will be found advisable to modify the system as shown in Fig. 5, in which a portion of the heat is absorbed by the exit gases directly and the remainder by an unobjectionable cooling gas which after being heated is injected into the exit gases to dilute them. The exit gases in this system are passed back through the heat transferrers 7 and 5 and then to the stack. Cooling gas such as air is forced through the heat transferrer 3 by the blower 10 and then into the stack along with the exit gases. In the contact sulfuric acid process it will ordinarily be found that sufficient heat is generated in the conversion stages alone to give the stack gases a sufficiently high temperature to insure their thorough diffusion into the atmosphere. Moreover, the gases leaving the heat transferrer 5 may be at too high a temperature to act efficiently as a cooling medium for the hot burner gases. Under these conditions to insure efficient cooling in the heat transferrer 3 it may be found advisable to force air therethrough as above described. This heated air upon injection into the stack gases will dilute them and further increase their diffusion when discharged.

It will be seen that in operating in accordance with my invention utilization is made of excess heat hitherto wasted. The great disadvantage of the known systems of increasing the diffusion of obnoxious exit gases is overcome, in that it is not necessary to supply additional fuel and heating means. No extra equipment is required, as the use of heat transferrers is necessary in any case to remove the excess heat developed in the system and to maintain control of the heat balances. My invention may be applied to many systems now operating, by merely passing the exit gases from the system through the heat transferrers in place of the air or other gas formerly used for cooling. When operating in accordance with the principles of Figs. 3 and 4 it merely becomes necessary to introduce the hot gases leaving the heat transferrers into the stack gases, instead of discharging them into the atmosphere as is now done.

The terms "sulfur burner," "converter" and "absorber," as used in the claims, are intended to be generic and to define one or more of these elements. The term "absorber" is intended to define any means for collecting the $SO_3$ produced in the system.

It will be obvious that many modifications of the invention disclosed herein in its application to various systems in which excess heat is developed may be made without departing from the spirit of the invention as defined in the following claims.

I claim:—

1. The combination with an operation involving an exothermal reaction whereby excess heat is developed and in which waste gases are produced, of heat transferrers located at points in the system where excess heat is developed, means for passing a cooling gas through at least one of said heat transferrers and means for introducing said cooling gas after passage through said transferrers into said waste gases.

2. In the process of manufacturing sulfuric acid by the contact process from $SO_2$ gas, that step which consists in raising the temperature of waste gases on their way to be discharged from the process by means of heat generated in the conversion of $SO_2$ to $SO_3$.

3. The combination with a system for the manufacture of sulfuric acid comprising a brimstone burner, a converter, and means for collecting the $SO_3$ produced, of means for transferring heat produced in the burner and converter to the waste gases from the process prior to their discharge, whereby the discharge temperature of said waste gases is raised.

4. The combination with a system for the manufacture of sulfuric acid comprising a sulfur burner, a converter, and an absorber, of means for passing waste gases from the system on their way to be discharged in heat transfer relation to the hot gases produced in the converter.

5. The combination with a system for the production of sulfuric acid comprising a burner for producing hot sulfur dioxide gas, a converter for producing hot converted gas, and an absorber, of means for passing an unobjectionable cooling medium in heat transfer relation to hot gas in the system at at least one point in the system, and means for introducing said cooling medium subsequent to its cooling action into the waste gases leaving the system.

6. In the process of manufacturing sulfuric acid from sulfur dioxide gas by the contact process, that improvement which comprises maintaining a desired temperature condition in the sulfur dioxide gas undergoing conversion by removing excess heat from said gas by controlled transfer of said heat to waste gases on their way to be discharged from the system.

7. In the process of manufacturing sulfuric acid from a sulfur dioxide gas, that improvement which comprises transferring a predetermined quantity of excess heat generated in said process to an unobjectionable gas, thereby heating said unobjectionable gas, and raising the temperature of waste gases on their way to be discharged from the process by admixing the waste gases with said heated gas.

8. The process of treating exit gases from the manufacture of sulfuric acid by the contact process which comprises raising the discharge temperature of said gases to more than approximately 400° C. by heating said gases prior to discharge by means of heat developed in the system.

9. The process of treating waste gases from the manufacture of sulfuric acid by the contact process to increase their diffusion into the atmosphere, which consists in raising the normal discharge temperature of said gases when so exhausted as to be ready for discharge to the stack, by means of excess heat developed in the system and thereby heating said gases to more than approximately 400° C.

10. The process of treating exit gases from the manufacture of sulfuric acid by the contact process wherein excess heat is developed which comprises absorbing excess heat in an unobjectionable gas and then mixing said heated gas with the exit gas from the process prior to discharge therefrom to raise the temperature of the exit gases substantially above their normal discharge temperature.

11. The process of treating exit gases from the manufacture of sulfuric acid by the contact process wherein excess heat is developed which comprises passing an unobjectionable gas in heat transfer relation with at least one point in the system at which excess heat is developed, and then injecting said heated unobjectionable gas into the exit gases from the system prior to discharge therefrom to raise the temperature of the exit gases substantially above their normal discharge temperature.

12. In the process of manufacturing sulfuric acid by the contact process that improvement which comprises transferring excess heat generated in said process to a mixture of an unobjectionable gas and waste gases from the process on their way to be discharged therefrom whereby the temperature of the exit gases is raised.

13. The process of treating exit gases from the manufacture of sulfuric acid by the contact process which comprises diluting the said gases with an unobjectionable gas, and raising the discharge temperature of the mixture of exit gases and unobjectionable gas thus formed to more than approximately 400° C. by means of heat developed in the process.

14. The process of treating exit gases from an operation involving an exothermic reaction wherein excess heat is developed which consists in absorbing excess heat in an unobjectionable gas to raise the temperature of such unobjectionable gas in excess of the normal discharge temperature of said exit gases, and then mixing the said heated unobjectionable gas with the exit gases from the system prior to discharge therefrom to raise the temperature of the exit gases substantially above normal exit temperature.

15. The process of treating the waste gases from an operation involving an exothermic reaction wherein excess heat is developed which consists in passing an unobjectionable gas into heat transfer relation with at least one point in the system at which excess heat is developed to raise the temperature of the unobjectionable gas in excess of the normal discharge temperature of said exit gases, and then injecting said heated unobjectionable gases into the exit gases to raise the temperature of the exit gases substantially above normal exit temperature.

In testimony whereof I have hereunto set my hand.

HENRY F. MERRIAM.